United States Patent
Chavan et al.

(10) Patent No.: US 12,069,049 B2
(45) Date of Patent: Aug. 20, 2024

(54) APPARATUS AND METHODS FOR RESTRICTED BINDING OF PORTS

(71) Applicant: Apple Inc., Cupertino, CA (US)

(72) Inventors: Sushant U. Chavan, San Jose, CA (US); Vincent Lubet, Los Altos, CA (US); David Schinazi, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 289 days.

(21) Appl. No.: 17/007,324

(22) Filed: Aug. 31, 2020

(65) Prior Publication Data
US 2021/0377265 A1   Dec. 2, 2021

Related U.S. Application Data

(60) Provisional application No. 63/033,628, filed on Jun. 2, 2020.

(51) Int. Cl.
| | |
|---|---|
| *H04L 29/00* | (2006.01) |
| *G06F 13/10* | (2006.01) |
| *G06F 21/82* | (2013.01) |
| *H04L 9/40* | (2022.01) |
| *H04L 69/16* | (2022.01) |

(52) U.S. Cl.
CPC .......... *H04L 63/0876* (2013.01); *G06F 13/10* (2013.01); *G06F 21/82* (2013.01); *H04L 69/16* (2013.01)

(58) Field of Classification Search
CPC ..... H04L 63/0876; H04L 69/16; G06F 13/10; G06F 21/82
USPC .............................................. 726/4
See application file for complete search history.

(56) References Cited

U.S. PATENT DOCUMENTS

| | | | |
|---|---|---|---|
| 7,287,077 B2 * | 10/2007 | Haugh | H04L 67/06 709/225 |
| 8,755,392 B2 | 6/2014 | Traversat et al. | |
| 10,365,941 B2 * | 7/2019 | Borra | G06F 9/5061 |

* cited by examiner

*Primary Examiner* — Jeffrey C Pwu
*Assistant Examiner* — Michael D Anderson
(74) *Attorney, Agent, or Firm* — FLETCHER YODER PC

(57) ABSTRACT

An electronic device includes a port binding module that binds ports to processes. A process running on the electronic device sends a port request to the port binding module. The port binding module determines whether the requested port is a restricted port. If not, the port binding module binds the requested port to the process. If the requested port is restricted, then the port binding module determines whether the requesting process has an entitlement corresponding to the port. If the requesting process has the corresponding entitlement, then the port binding module binds the requested restricted port to the process. If not, then the port binding module denies binding the requested restricted port to the process.

20 Claims, 7 Drawing Sheets

APPARATUS AND METHODS FOR RESTRICTED BINDING OF PORTS

CROSS-REFERENCE TO RELATED APPLICATION

This application claims the benefit of U.S. Provisional Application No. 63/033,628, filed Jun. 2, 2020, which is hereby incorporated by reference in its entirety for all purposes.

BACKGROUND

The present disclosure relates generally to computer networks, and more particularly to securely sending and receiving information over a computer network.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Computing devices may use ports (e.g., Transmission Control Protocol (TCP) or User Datagram Protocol (UDP) ports) to transfer information between one another. Some of these ports are well-known (e.g., ports having number less than 1024), and are convenient to use as the well-known ports do not need to be discovered or searched for prior to use.

However, if a process of a computing device binds to a well-known port without preventing other processes from using the port, then another process (e.g., from another computing device) may also bind to the port, possibly resulting in denial of service to the process or leakage of private user data.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

An electronic device includes a port binding module that may bind ports to processes. The port binding module may be software that exists as machine-readable instructions stored on a memory or storage device that are executable by a processor of the electronic device, firmware stored on the memory or storage device, and/or hardware of the electronic device. A process running on the electronic device may send a port request to the port binding module in order to communicate with an external electronic device. The port binding module may determine whether the requested port is a restricted or "well-known" port (e.g., a port having a number less than 1024). If not, the port binding module may bind the requested port to the process.

If the requested port is restricted, then the port binding module may determine whether the requesting process has or is associated with an entitlement corresponding to the port. The entitlement may be a data type (e.g., a string) that grants the process permission to bind to the port. The port binding module may refer to a port/entitlement table that lists various ports and associated entitlements that grant permission for binding the respective ports. If the requesting process has the corresponding entitlement, then the port binding module binds the requested restricted port to the process. If not, then the port binding module denies binding the requested restricted port to the process.

In this manner, the port binding module may provide exclusive access of a restricted port to a process, thus preventing or reducing the likelihood of denial of service to the process or leakage of private user data.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment", "an embodiment", or "in some embodiments" of the present disclosure are not intended to be interpreted as excluding the existence of additional embodiments that also incorporate the recited features.

The disclosed embodiments may apply to a variety of electronic devices. In particular, any electronic device that transmits or receives signals over a communication network may incorporate the disclosed port binding module or techniques to prevent or reduce the likelihood of denial of service to the process or leakage of private user data. With the foregoing in mind, a general description of suitable electronic devices that may include the disclosed port binding module or techniques is provided below.

Figure 1:
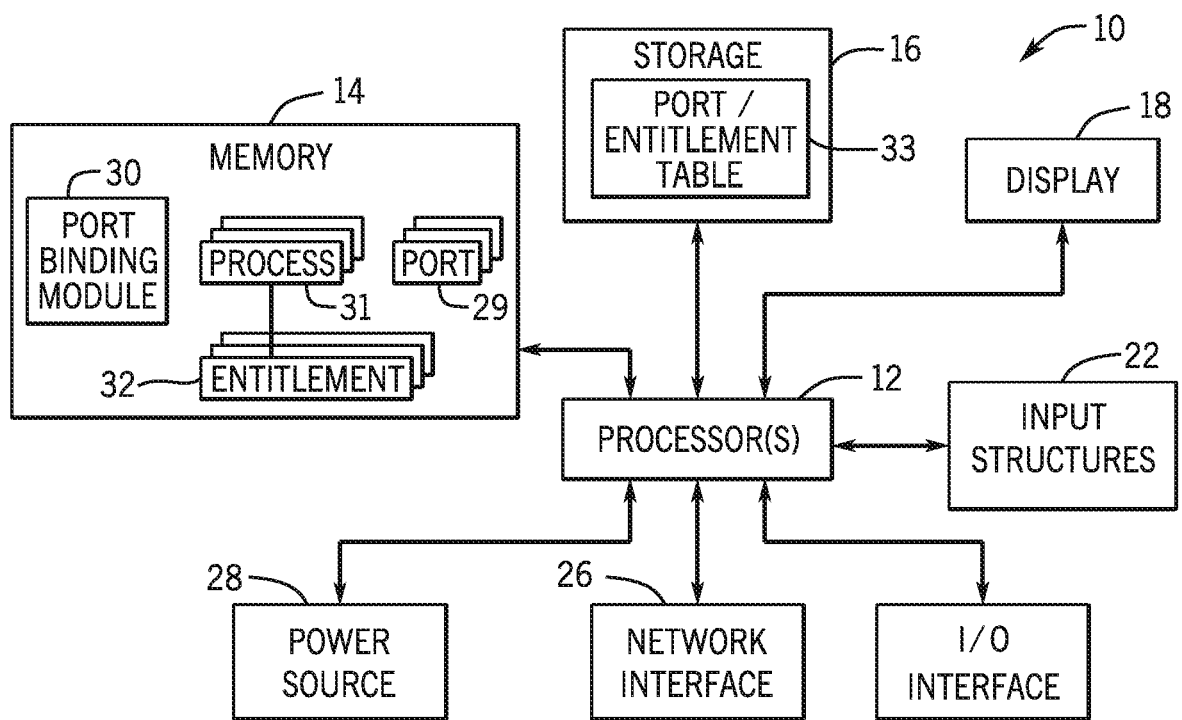
FIG. 1 is a schematic block diagram of an electronic device including a transceiver, in accordance with an embodiment.

Turning first to FIG. 1, an electronic device 10 according to an embodiment of the present disclosure may include, among other things, one or more of processors 12, memory 14, nonvolatile storage 16, a display 18, input structures 22, an input/output (I/O) interface 24, a network interface 26, and a power source 28. The various functional blocks shown in FIG. 1 may include hardware elements (including circuitry), software elements (including computer code stored on a computer-readable medium) or a combination of both hardware and software elements. Furthermore, a combination of elements may be included in tangible, non-transitory, and machine-readable medium that include machine-readable instructions. The instructions may be executed by the processor 12 and may cause the processor 12 to perform operations as described herein. It should be noted that FIG. 1 is merely one example of a particular embodiment and is intended to illustrate the types of elements that may be present in the electronic device 10. Additionally, reference to the processor 12 in the present disclosure should be understood to include any processor or combination of processors of the one or more of processors 12.

Figure 2:
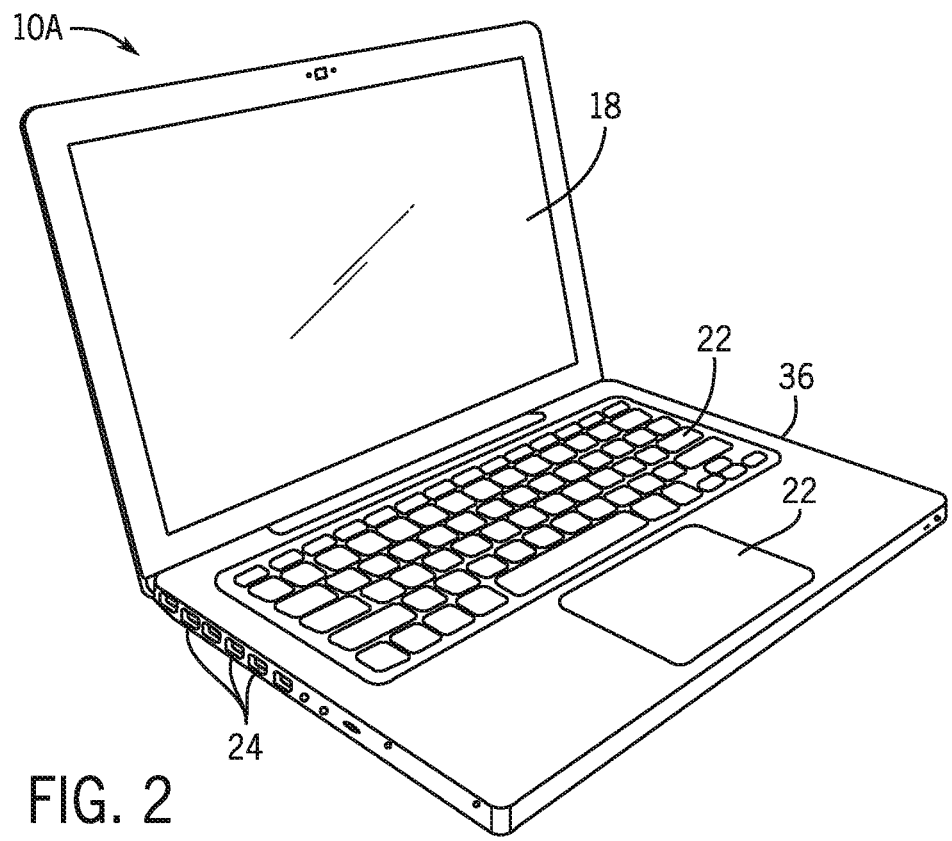
FIG. 2 is a perspective view of a notebook computer representing a first embodiment of the electronic device of FIG. 1.
Figure 4:
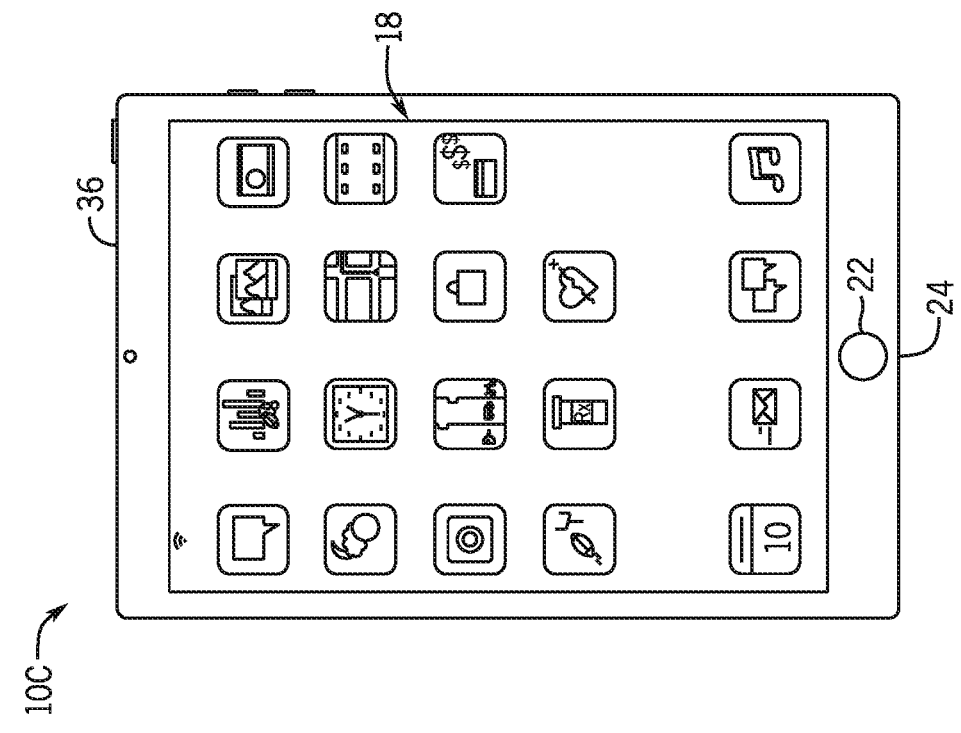
FIG. 4 is a front view of another handheld device representing a third embodiment of the electronic device of FIG. 1.
Figure 3:
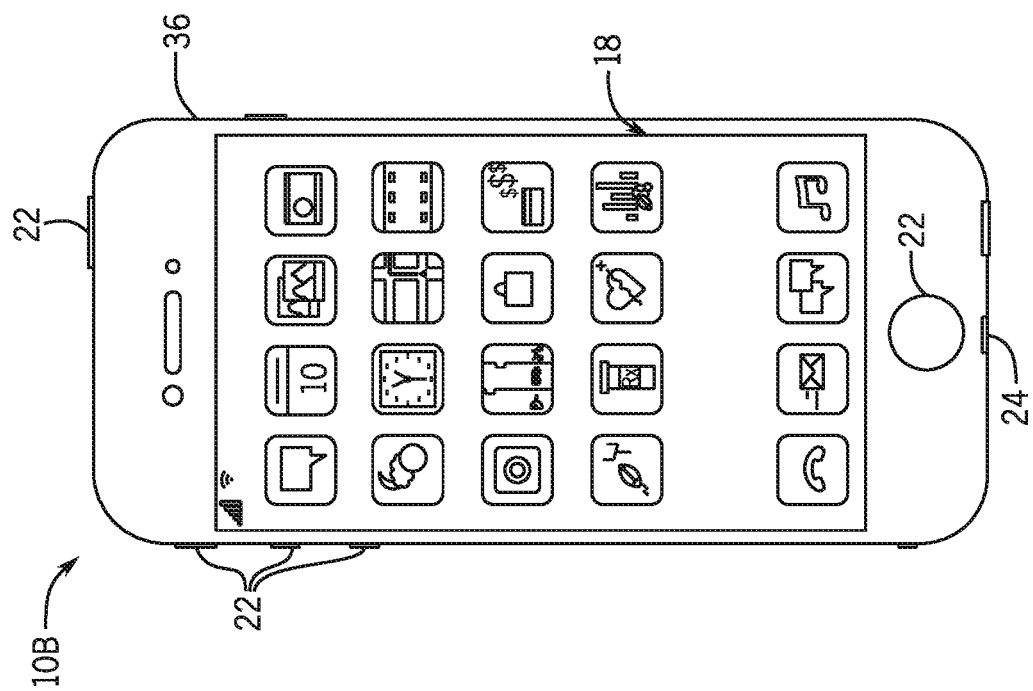
FIG. 3 is a front view of a handheld device representing a second embodiment of the electronic device of FIG. 1.
Figure 5:
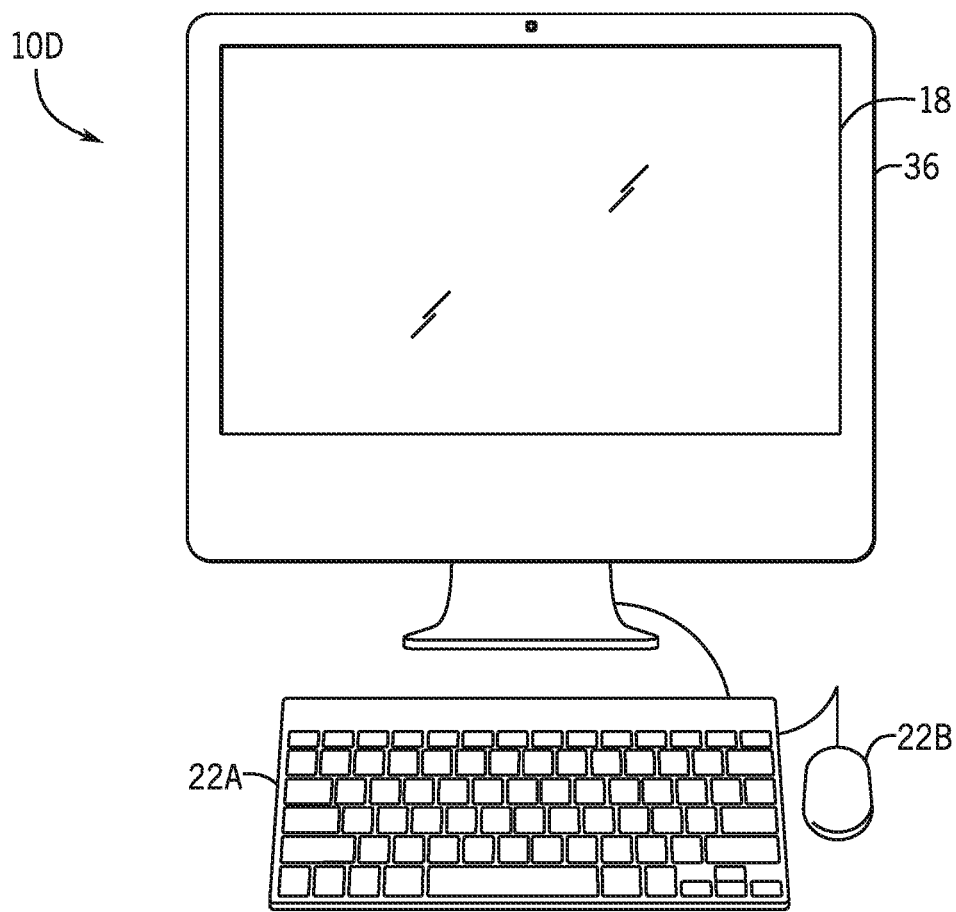
FIG. 5 is a front view of a desktop computer representing a fourth embodiment of the electronic device of FIG. 1.
Figure 6:
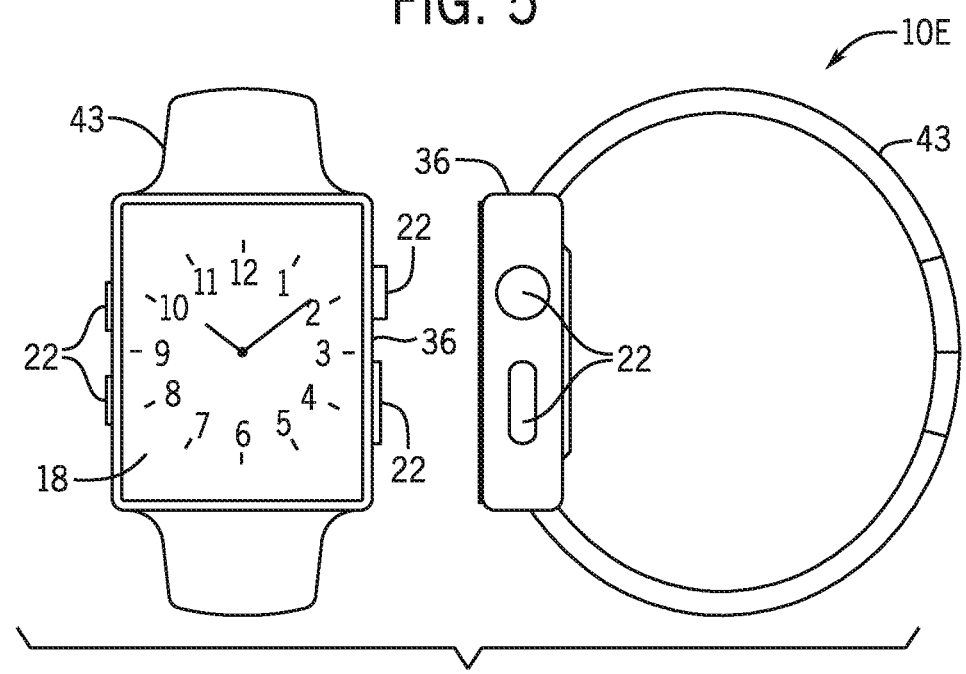
FIG. 6 is a front view and side view of a wearable electronic device representing a fifth embodiment of the electronic device of FIG. 1.

By way of example, a block diagram of the electronic device 10 may represent the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor 12 may operably couple with the memory 14 and the nonvolatile storage 16 to perform various algorithms. Such programs or instructions executed by the processor 12 may be stored in any suitable article of manufacture that includes one or more tangible, computer-readable media at least collectively storing the instructions or processes, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions executable by the processor 12 to enable the electronic device 10 to provide various functionalities.

As illustrated, the memory 14 may store ports 29 (e.g., Transmission Control Protocol (TCP) or User Datagram Protocol (UDP) ports) that enable the electronic device 10 to communicate with other electronic devices via the network interface 26. The memory 14 may also store a port binding module 30 as instructions executable by the processor 12. The port binding module 30 may enable processes 31, also stored in the memory as instructions executable by the processor 12, to bind to respective ports 29. The memory 14 may additionally or alternatively store entitlements 32 that enable processes 31 to bind to restricted or "well-known" ports (e.g., ports having number less than 1024). As such, the well-known ports may be referred to as "entitlement-restricted ports". While the ports 29, the port binding module 30, the processes 31, and the entitlements 32 are illustrated as being stored in the memory 14, it should be understood that these elements may be stored in any suitable medium or component, such as the storage 16 and/or the network interface 26. Moreover, while the port binding module 30 is described as software, it should be understood that the port binding module 30 may be implemented, in whole or in part, as firmware (e.g., stored on the memory 14 or storage 16) and/or hardware (e.g., as part of the processor 12 and/or the network interface 26) of the electronic device 10.

The storage 16 may store a port/entitlement table 33 that lists various port numbers and associated entitlements 32 that grant permission for binding the respective ports 29. For example, the port binding module 30 may query the port/entitlement table 33 to determine whether a process 31 has the proper entitlement 32 for a port 29 that it is requesting to bind to.

In certain embodiments, the display 18 may be a liquid crystal display (LCD), which may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable the electronic device 10 to interface with various other electronic devices, as may the network interface 26.

The network interface 26 may include, for example, one or more interfaces for a personal area network (PAN), such as a BLUETOOTH® network, for a local area network (LAN) or wireless local area network (WLAN), such as an 802.11x WI-FI® network, and/or for a wide area network (WAN), such as a $3^{rd}$ generation (3G) cellular network, $4^{th}$ generation (4G) cellular network, long term evolution (LTE®) cellular network, long term evolution license assisted access (LTE-LAA) cellular network, $5^{th}$ generation (5G) cellular network, or New Radio (NR) cellular network. The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth. The network interface 26 may be implemented as software (e.g., as a logical construct) and/or hardware (e.g., as a network interface controller, card, or adapter).

As further illustrated, the electronic device 10 may include the power source 28. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may be generally portable (such as laptop, notebook, and tablet computers) and/or those that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. of Cupertino, California. By way of example, the electronic device 10, taking the form of a notebook computer 10A, is illustrated in FIG. 2 in accordance with one embodiment of the present disclosure. The notebook computer 10A may include a housing or the enclosure 36, the display 18, the input structures 22, and ports associated with the I/O interface 24. In one embodiment, the input structures 22 (such as a keyboard and/or touchpad) may enable interaction with the notebook computer 10A, such as starting, controlling, or operating a graphical user interface (GUI) and/or applications running on the notebook computer 10A. For example, a keyboard and/or touchpad may facilitate user interaction with a user interface, GUI, and/or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, California. The handheld device 10B may include the enclosure 36 to protect interior elements from physical damage and to shield them from electromagnetic interference. The enclosure 36 may surround the display 18. The I/O interface 24 may open through the enclosure 36 and may include, for example, an I/O port for a hard wired connection for charging and/or content manipulation using a standard connector and protocol, such as the Lightning connector provided by Apple Inc. of Cupertino, California, a universal serial bus (USB), or other similar connector and protocol.

The input structures 22, in combination with the display 18, may enable user control of the handheld device 10B. For example, the input structures 22 may activate or deactivate the handheld device 10B, navigate a user interface to a home screen, present a user-editable application screen, and/or activate a voice-recognition feature of the handheld device 10B. Other of the input structures 22 may provide volume control or may toggle between vibrate and ring modes. The input structures 22 may also include a microphone to obtain a user's voice for various voice-related features, and a speaker to enable audio playback. The input structures 22 may also include a headphone input to enable input from external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, California.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. of Cupertino, California. It should be noted that the computer 10D may also represent a personal computer (PC) by another manufacturer. The enclosure 36 may protect and enclose internal elements of the computer 10D, such as the display 18. In certain embodiments, a user of the computer 10D may interact with the computer 10D using various peripheral input devices, such as keyboard 22A or mouse 22B (e.g., input structures 22), which may operatively couple to the computer 10D.

Similarly, FIG. 6 depicts a wearable electronic device 10E representing another embodiment of the electronic device 10 of FIG. 1. By way of example, the wearable electronic device 10E, which may include a wristband 43, may be an Apple Watch® by Apple Inc. of Cupertino, California. However, in other embodiments, the wearable electronic device 10E may include any wearable electronic device such as, a wearable exercise monitoring device (e.g., pedometer, accelerometer, heart rate monitor), or other device by another manufacturer. The display 18 of the wearable electronic device 10E may include a touch screen version of the display 18 (e.g., LCD, OLED display, active-matrix organic light emitting diode (AMOLED) display, and so forth), as well as the input structures 22, which may facilitate user interaction with a user interface of the wearable electronic device 10E.

In certain embodiments, as previously noted above, each embodiment (e.g., notebook computer 10A, handheld device 10B, handheld device 10C, computer 10D, and wearable electronic device 10E) of the electronic device 10 may include the disclosed port binding module 30 or techniques to prevent or reduce the likelihood of denial of service to the process or leakage of private user data.

Figure 7:
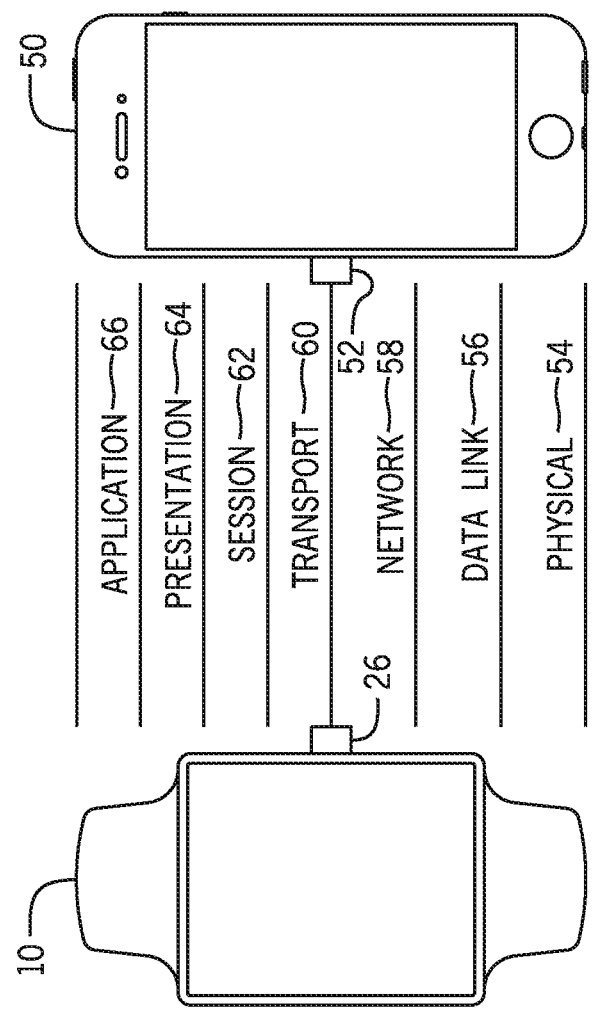
FIG. 7 is a diagram showing the electronic device of FIG. 1 communicating with another electronic device and corresponding Open Systems Interconnection model layers, according to embodiments of the present disclosure.

With the foregoing in mind, FIG. 7 is a diagram showing the electronic device 10 communicating with another electronic device 50 and corresponding Open Systems Interconnection (OSI) model layers, according to embodiments of the present disclosure. As illustrated, the electronic device 10 may communicate with the other electronic device 50 via respective network interfaces 26, 52. The OSI model layers include a physical layer 54, a data link layer 56, a network layer 58, a transport layer 60, a session layer 62, a presentation layer 64, and an application layer 66. In particular, because the disclosed port binding module 30 and techniques affect binding of the TCP and UDP ports, the disclosed port binding module 30 and techniques relate to the transport layer 60.

Figure 8:
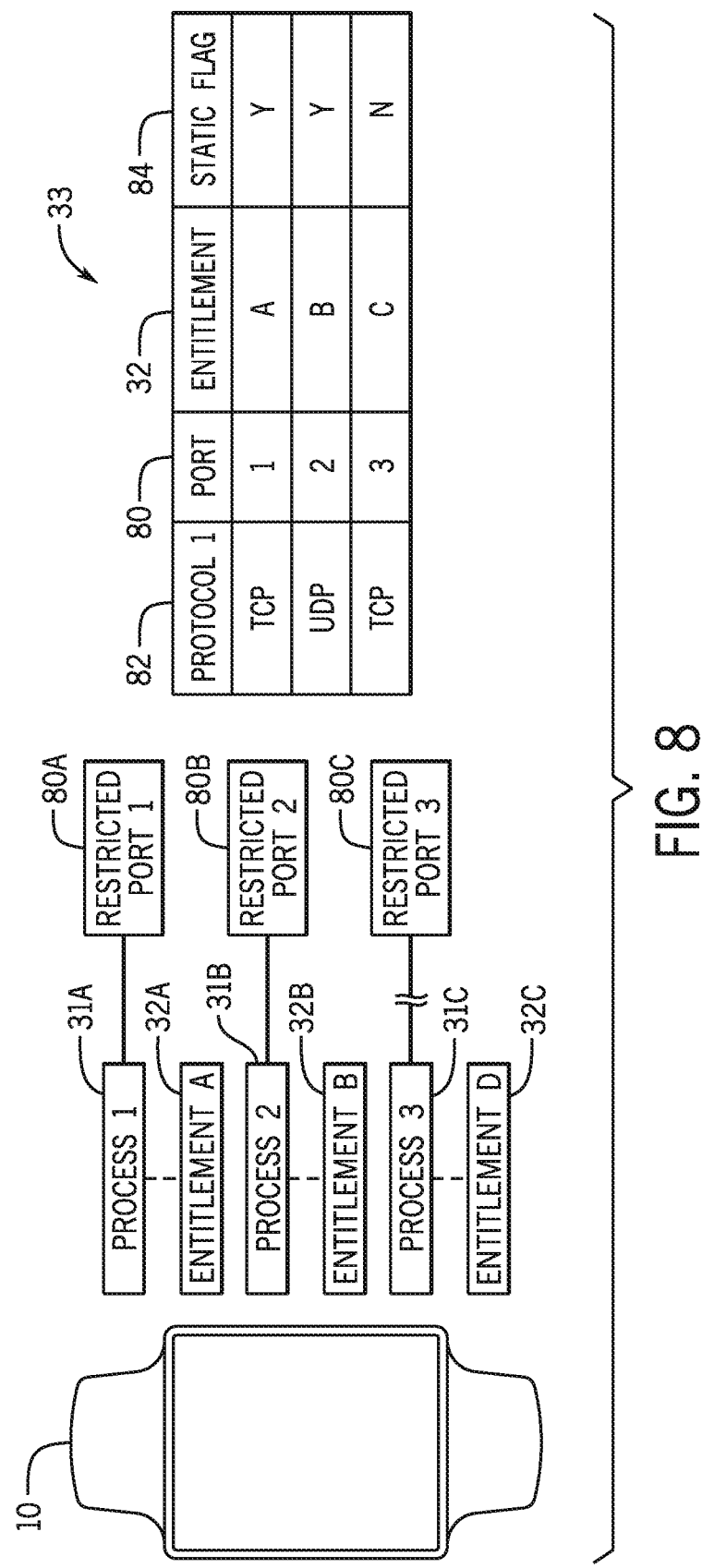
FIG. 8 is a schematic diagram illustrating binding processes to restricted ports in the electronic device of FIG. 1, according to embodiments of the present disclosure.

FIG. 8 is a schematic diagram illustrating binding processes 31 (e.g., binding processes 31A, 31B, and 31C to restricted ports 80 (e.g., restricted ports 80A, 80B, and 80C, respectively), according to embodiments of the present disclosure. As referred to herein, a process 31 may refer to an instance of a computer program that is being executed by one or many threads. The process 31 may include the computer program code and its activity. Depending on the operating system executing the computer program, the process 31 may be made up of multiple threads of execution that execute instructions concurrently.

In general, TCP and UDP ports may have port numbers having a 16-bit unsigned integer, thus ranging from 0 to 65535. Of these port numbers, the lowest numbered 1024 port numbers (e.g., ports 0-1023) identify or are reserved for the historically most commonly used services, and are called the well-known ports 80. The well-known ports 80 may be used by system processes that provide widely used types of network services. Higher-numbered ports (e.g., ports 1024-65535) are available for general use by applications and are known as "ephemeral ports". For example, well-known ports 80 include a Dynamic Host Configuration Protocol (DHCP) client port 68, an Internet-sharing Domain Name System (DNS) port 53, and a DHCP server port 67.

A process 31 may bind to a port (including a well-known port 80) to send or receive information via the port (e.g., to an external electronic device). For example, binding to a port may include specifying an Internet Protocol (IP) address so that the network layer know from which network interface to forward network traffic. As mentioned above, if a process 31 binds to a well-known port 80 without preventing other processes from using the port 80, then another process (e.g., from another computing device) may also bind to the port 80, possibly resulting in denial of service to the process 31 or leakage of private user data.

It is known that there are certain mechanisms, such as those provided by Linux and other UNIX-like systems, that limit binding of the well-known ports 80 to processes associated with a "superuser" privilege (e.g., those associated with a special user account used for system administration). However, these mechanisms do not prevent other processes (e.g., also associated with a superuser privilege) from accessing the well-known ports. Moreover, it is relatively easy for processes to execute with superuser privileges. Additionally, in some cases, while it may be desirable to enable a certain process 31 to exclusively bind to a well-known port 80, it may be undesirable to grant superuser, root, or other administrative privileges to the process 31.

As such, to enable a process 31 to exclusively bind to a well-known port 80, and thus prevent other processes from binding to the well-known port 80, the process 31 may be associated with an entitlement 32. An entitlement 32 may be a data type (e.g., a string) that grants the process 31 permission to bind to the well-known port 80. In particular, the entitlement 32 may be a property of, and thus be identifiable by, a binary executable that is protected by code signing so that the binary executable may be authenticated, e.g., by an operating system of the electronic device 10 at the time the process 31 requests binding. The entitlement 32 may be code-signed at the time the process 31 is compiled or built. That is, at the time the process 31 is compiled or built, a hash function may be applied to the entitlement 32 to generate a hash. The hash may then be encrypted using a private key (e.g., of the process 31). The encrypted hash and a public key (e.g., of the process 31) may be combined to a digital signature, which may be appended to the entitlement 32. When the process 31 requests binding of a port (e.g., the well-known port 80), the operating system of the electronic device 10 may use the public key to decrypt the hash, generate or calculate a new hash for the entitlement 32, and authenticate the entitlement 32 if the decrypted hash matches the new hash.

There may be a class of entitlements 32 that may only be used by a maker of the operating system (e.g., Apple Inc. for Apple operating systems). For such operating system-only entitlements, a restricted port 80 effectively becomes an operating system-only system service when bound to an Apple operating system process. While the present disclosure discusses binding well-known ports 80, it should be understood that the disclosed techniques may also be applied to ephemeral ports (e.g., ports 1024-65535) as well.

As illustrated, "Process 1" 31A is associated with or has "Entitlement A" 32A, "Process 2" 31B is associated with or has "Entitlement B" 32B, and "Process 3" 31C is associated with "Entitlement D" 32C. Process 1 attempts to bind "Port 1" 80A by sending a request to the port binding module 30, Process 2 attempts to bind "Port 2" 80B by sending a request to the port binding module 30, and Process 3 attempts to bind "Port 3" 80C by sending a request to the port binding module 30. The port binding module 30, which may be a software application, service, or process executed by the operating system of the electronic device 10, may receive the requests, and query the port/entitlement table 33 to determine whether each respective process 31 has the proper entitlement 32 for the requested restricted port 80. As mentioned above, the port/entitlement table 33 stores various port numbers and their associated entitlements 32.

In the illustrative example, the first row of the port/entitlement table 33 indicates that the entitlement 32 that enables binding to Port 1 is Entitlement A. Accordingly, the port binding module 30 may bind Port 1 to Process 1, since Process 1 is associated with Entitlement A. Similarly, the second row of the port/entitlement table 33 indicates that the entitlement 32 that enables binding to Port 2 is Entitlement B. Accordingly, the port binding module 30 may bind Port 2 to Process 2, since Process 2 is associated with Entitlement B. However, the third row of the port/entitlement table 33 indicates that the entitlement 32 that enables binding to Port 3 is Entitlement C. Because Process 3 is associated with Entitlement D and not Entitlement C, the port binding module 30 may deny binding Port 3 to Process 3. In this manner, the port binding module 30 may provide exclusive access of a restricted port 80 to a process 31, preventing other processes from accessing the bound and restricted port 80, thus reducing the likelihood of denial of service to the process 31 or leakage of private user data. Moreover, the process 31 may bind to the restricted port without superuser, root, or other administrative privileges, which may be desirable in some circumstances.

As illustrated, the port/entitlement table 33 may store additional information relevant to the port-entitlement relationships, including a protocol 82 associated with the restricted port 80 (e.g., TCP or UDP), and a flag 84 indicative of whether the restricted port 80 is statically defined at build time or if the port is supplied dynamically at runtime by a process. That is, the port/entitlement table 33 may be defined in the operating system of the electronic device 10 at build time of the operating system. This is because some processes 31 may not be able to use a service discovery protocol, and thus are unable to determine ports to use at runtime. As such, at least the restricted ports 80 related to these processes 31 may be defined at build time of the operating system, and the corresponding flag 84 in the port/entitlement table 33 may indicate as such. Meanwhile, the restricted ports 80 related to processes 31 that may be able to use a service discovery protocol may be defined dynamically at runtime of the operating system, and the corresponding flag 84 in the port/entitlement table 33 may indicate as such.

While the port/entitlement table 33 and the example shown in FIG. 8 illustrates one restricted port 80 associated with one entitlement 32, it should be understood that, in some embodiments a restricted port 80 may be associated with multiple entitlements 32, or multiples restricted ports 80 may be associated with one entitlement 32.

Figure 9:
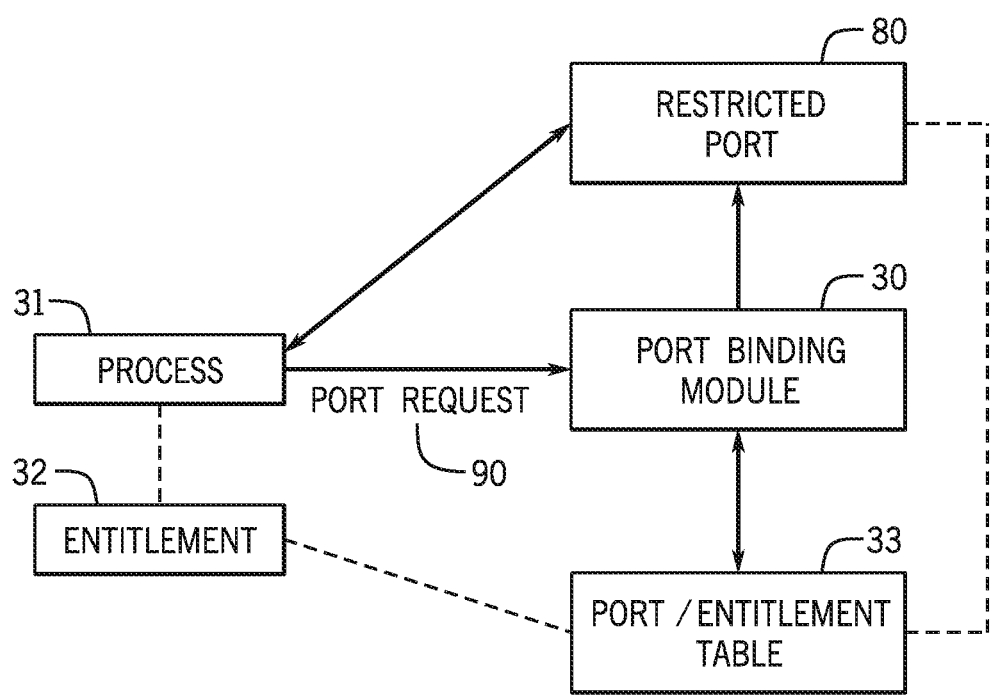
FIG. 9 is a block diagram illustrating relationships between components for binding a process to a restricted port in the electronic device of FIG. 1, according to embodiments of the present disclosure.

FIG. 9 is a block diagram illustrating relationships between components for binding a process 31 to a restricted port 80, according to embodiments of the present disclosure. The process 31 is associated with an entitlement 32 and sends a port request 90 to the port binding module 30 to bind to a restricted port 80. The port binding module 30 queries the port/entitlement table 33, which stores the entitlements that enable binding to each restricted port 80, to determine whether the entitlement 32 is associated with the restricted port 80. If so, the port binding module 30 binds the restricted port 80 to the process 31. The port binding module 30 may dynamically bind the restricted port 80 to the process 31, and the restricted port 80 may be bound for the lifetime of the process 31. If the entitlement 32 is not associated with the restricted port 80, as reflected by the port/entitlement table 33, then the port binding module 30 denies binding the restricted port 80 to the process 31.

In some embodiments, multiple ports 80 may be associated with the same entitlement 32. For example, ports 80 that may be functionally related (e.g., with regards to TCP communications, UDP communications, DHCP operations) may be associated with the same entitlement 32, so that a process 31 having that entitlement 32 may conveniently bind any of those ports 80. Additionally or alternatively, multiple processes 31 may have or be associated with the same entitlement 32. This way, an entitlement 32 that enables binding to a specific port 80 may be distributed among multiple processes 31 so that each process 31 has the ability to bind to the port 80. While a first process 31 may release a port 80 prior to a second process 31 binding to the port 80, in some cases, multiple processes 31 may be bound to the same port 80 at the same time, e.g., for different purposes. For example, a first process 31 may bind to a DHCP port 67 or 68 for Ethernet operations, while a second process 31 may simultaneously bind to the DHCP port for Wi-Fi operations. In such an example, binding to the port may include an indication (e.g., via a parameter of the binding process) of the purpose for which a process 31 may use the port in order to prevent conflicts.

Figure 10:
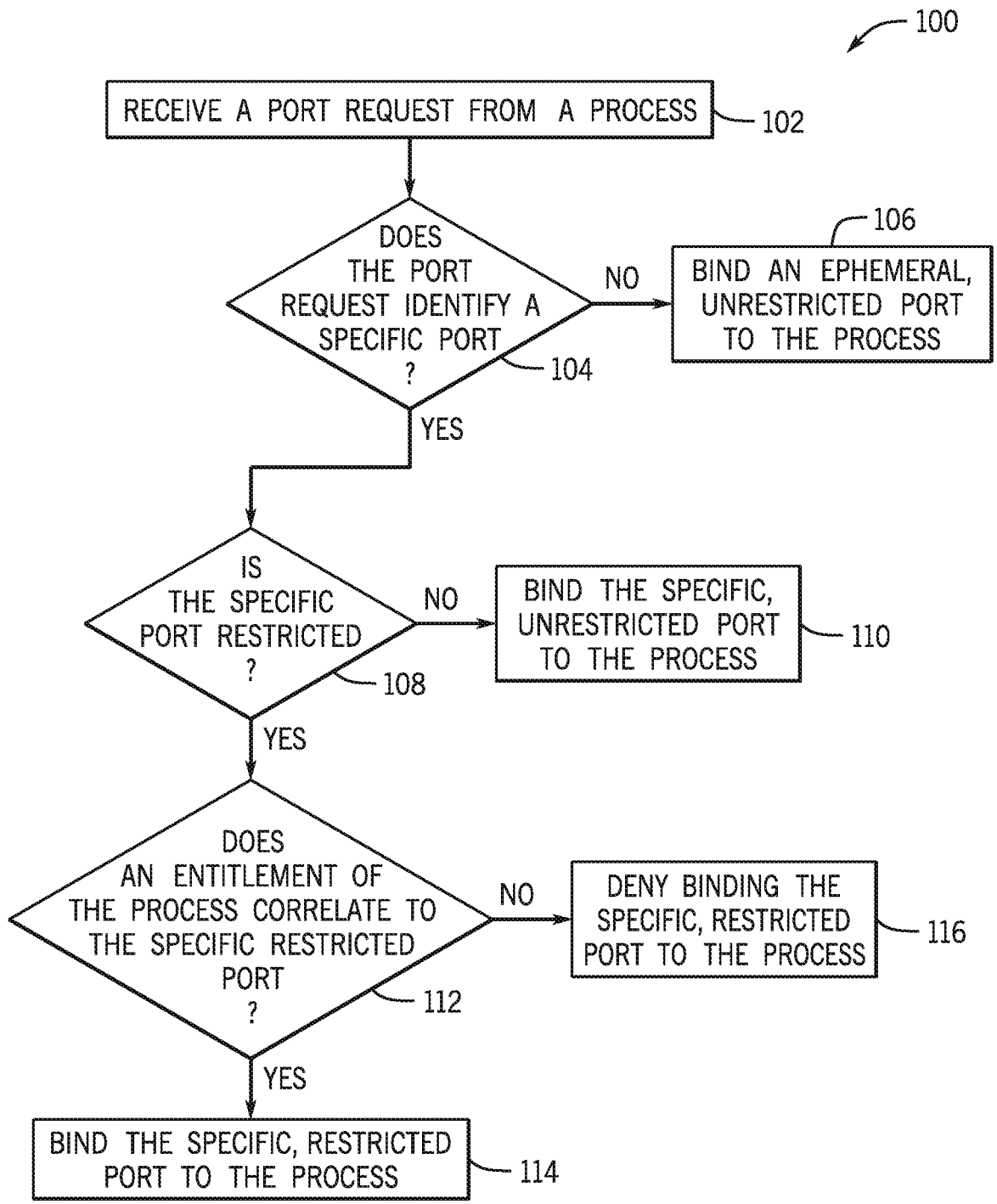
FIG. 10 is a flowchart of a method for binding a process to a port in the electronic device of FIG. 1, according to embodiments of the present disclosure.

FIG. 10 is a flowchart of a method 100 for binding a process 31 to a port 29, according to embodiments of the present disclosure. Any suitable device (e.g., a controller) that may control components of the electronic device 10, such as the processor 12, may perform the method 100. In some embodiments, the method 100 may be implemented by executing instructions stored in a tangible, non-transitory, computer-readable medium, such as the memory 14 or storage 16, using the processor 12. For example, the method 100 may be performed at least in part by one or more software components, such as an operating system of the electronic device 10, the port binding module 30 (as described below), and the like. While the method 100 is described using steps in a specific sequence, it should be understood that the present disclosure contemplates that the described steps may be performed in different sequences than the sequence illustrated, and certain described steps may be skipped or not performed altogether.

In process block 102, the port binding module 30 receives a port request 90 from a process 31. The process 31 may send the port request 90 to bind to a port 29 for use in sending or receiving information to or from an external electronic device. In some embodiments, the port request 90 may indicate a specific port 29 that the process 31 seeks to bind to (e.g., a port number).

In decision block 104, the port binding module 30 determines whether the port request 90 identifies a specific port. If not, then, in process block 106, the port binding module 30 may bind an ephemeral, unrestricted port to the process 31. That is, since the port request 90 does not specify a certain port, the port binding module 30 may bind a port 29 for which an entitlement 32 is not a prerequisite for binding. As mentioned above, the ephemeral, unrestricted ports may include TCP or UDP ports with numbers of 1024 to 65535.

If the port binding module 30 determines that the port request 90 identifies a specific port, then, in decision block 108, the port binding module 30 determines whether the specific port is restricted. If not, then, in process block 110, the port binding module 30 binds the specific, unrestricted port to the process 31. In this case, because the port is unrestricted, the port 29 may be an ephemeral TCP or UDP port with a number between 1024 to 65535. While the present disclosure discusses restricting well-known ports 80 to binding with processes 31 having corresponding entitlements 32, in some embodiments, the port binding module 30 may also restrict one or more ephemeral ports to binding with processes 31 having corresponding entitlements 32 as well.

If the port binding module 30 determines that the port request 90 identifies that the specific port is restricted, then, in decision block 112, the port binding module 30 determines whether an entitlement 32 of the process 31 correlates with the specific, restricted port 80. In particular, the port binding module 30 may query a port/entitlement table 33 that stores various restricted port numbers and their associated entitlements 32 to determine whether the process 31 has the proper entitlement 32 for the requested restricted port 80.

If so, then in process block 114, the port binding module 30 binds the specific, restricted port 80 to the process 31. If the port binding module 30 determines that the process 31 does not have an entitlement 32, or that the process 31 has an entitlement 32 that does not correlate with the specific, restricted port 80, then the port binding module 30 denies binding the specific, restricted port 80 to the process 31. In this manner, the method 100 may provide exclusive access of a restricted port 80 to a process 31, preventing other processes from accessing the bound and restricted port 80, thus reducing the likelihood of denial of service to the process 31 or leakage of private user data.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A computer-implemented method comprising:
receiving, via a computer, a first request from a first process to bind a first port;
identifying, via the computer, a first entitlement associated with the first process, wherein the first entitlement comprises a first string;
determining, via the computer, that the first entitlement associated with the first process corresponds to the first port;
binding, via the computer, the first port to the first process in response to determining that the first entitlement corresponds to the first port;
receiving, via the computer, a second request from a second process to bind a second port, wherein the second process is different from the first process and the second port is different from the first port;
identifying, via the computer, a second entitlement associated with the second process, wherein the second entitlement is the same as the first entitlement, wherein the second entitlement comprises a second string;
determining, via the computer, that the second entitlement associated with the second process corresponds to the second port; and
binding, via the computer, the second port to the second process in response to determining that the second entitlement corresponds to the second port.

2. The method of claim 1, wherein binding the second port to the second process occurs after the first process releases the first port.

3. The method of claim 1, wherein binding the second port to the second process occurs while the first port is bound to the first process.

4. The method of claim 1, comprising receiving, via the computer, a first indication of a purpose for binding the first port to the first process, and receiving a second indication of a purpose for binding the second port to the second process.

5. One or more tangible, non-transitory, computer-readable media, comprising computer-readable instructions that, when executed by one or more processors, cause the one or more processors to:
receive, from a first process, a request to bind to an entitlement-restricted port;
identify a first entitlement associated with the first process, wherein the first entitlement comprises a first string;
determine whether the first entitlement associated with the first process corresponds to an entitlement criterion to bind to the entitlement-restricted port, wherein the entitlement criterion corresponding to the entitlement-restricted port corresponds to the first entitlement and a second entitlement, the first entitlement is different from the second entitlement, and the second entitlement is associated with a second process different from the first process, and wherein the second entitlement comprises a second string;
upon determining that the first entitlement corresponds with the entitlement criterion, bind the entitlement-restricted port to the first process; and
upon determining that the first entitlement does not correspond with the entitlement criterion, deny binding of the entitlement-restricted port to the first process.

6. The one or more tangible, non-transitory, computer-readable media of claim 5, wherein causing the one or more processors to bind the entitlement-restricted port to the first process comprises preventing another process from binding to the entitlement-restricted port.

7. The one or more tangible, non-transitory, computer-readable media of claim 5, wherein the entitlement-restricted port comprises a Transmission Control Protocol (TCP) port or User Datagram Protocol (UDP) port.

8. The one or more tangible, non-transitory, computer-readable media of claim 5, wherein the entitlement-restricted port comprises a port number of between 0 and 1023.

9. The one or more tangible, non-transitory, computer-readable media of claim 5, wherein the first entitlement and the second entitlement are identifiable by a property of a binary executable that is protected by code signing.

10. The one or more tangible, non-transitory, computer-readable media of claim 5, wherein the first entitlement and the second entitlement are code-signed when the first process and the second process are built or compiled.

11. The one or more tangible, non-transitory, computer-readable media of claim 5, wherein causing the one or more processors to determine that the first entitlement correlates to the entitlement-restricted port comprises querying a table that stores a plurality of entitlement-restricted port numbers and associated entitlements that grant permission for binding a plurality of entitlement-restricted ports corresponding to the plurality of entitlement-restricted port numbers.

12. An electronic device comprising:
one or more storage devices configured to store a table listing a plurality of port numbers and a plurality of entitlements that grant permission for binding a plurality of ports corresponding to the plurality of port numbers;
one or more processors configured to:
receive a request from a process to bind to a first port of the plurality of ports;
identify a first entitlement of the plurality of entitlements associated with the process, wherein the first entitlement comprises a first string;
determine that the first entitlement associated with the process corresponds to the first port based on the table, wherein the first entitlement is different from a second entitlement associated with the process, and the second entitlement associated with the process corresponds to a second port different from the first port, and wherein the second entitlement comprises a second string; and
bind the first port to the process in response to at least determining that the first entitlement corresponds to the first port.

13. The electronic device of claim 12, wherein the table lists a plurality of indications of whether each port of the plurality of ports is statically defined at build time or supplied dynamically at runtime.

14. The electronic device of claim 12, wherein the one or more processors are configured to:
authenticate the first entitlement prior to binding the first port to the process; and bind the first port to the process in response to at least authenticating the first entitlement.

15. The electronic device of claim 12, wherein the one or more processors are configured to:
   receive a second request from the process to bind to the second port;
   identify the second entitlement associated with the process; and
   bind the second port to the process.

16. The method of claim 1, wherein determining, via the computer, that the first entitlement corresponds to the first port comprises querying, via the computer, a table that stores a plurality of entitlement-restricted port numbers and associated entitlements.

17. The method of claim 16, wherein the table lists a plurality of indications of whether each port of the plurality of entitlement-restricted port numbers is statically defined at build time or supplied dynamically at runtime.

18. The method of claim 1, wherein the first string is configured to grant the first process permission to bind.

19. The method of claim 1, wherein the second string is configured to grant the second process permission to bind.

20. The method of claim 1, comprising:
   authenticating, via the computer, the first entitlement via a first binary executable that is protected by a first code signing, wherein the first entitlement is identifiable by the first binary executable; and
   authenticating, via the computer, the second entitlement via a second binary executable that is protected by a second code signing, wherein the second entitlement is identifiable by the second binary executable.

* * * * *